Mar. 3, 1925.
E. WESTON
1,528,460
ELECTRICAL MEASURING INSTRUMENT
Filed June 15, 1916    3 Sheets-Sheet 1
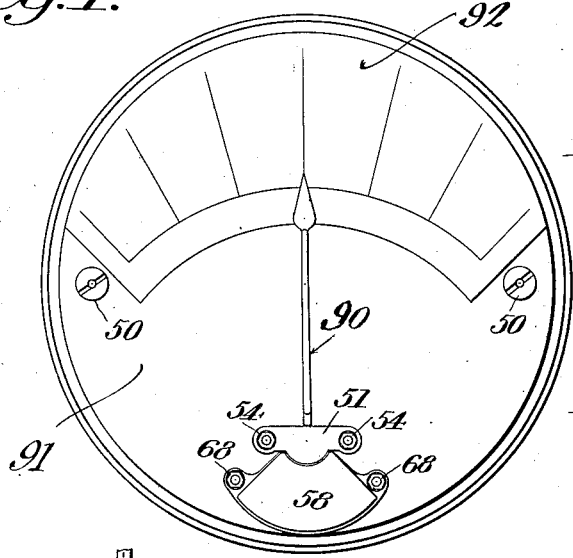
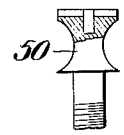
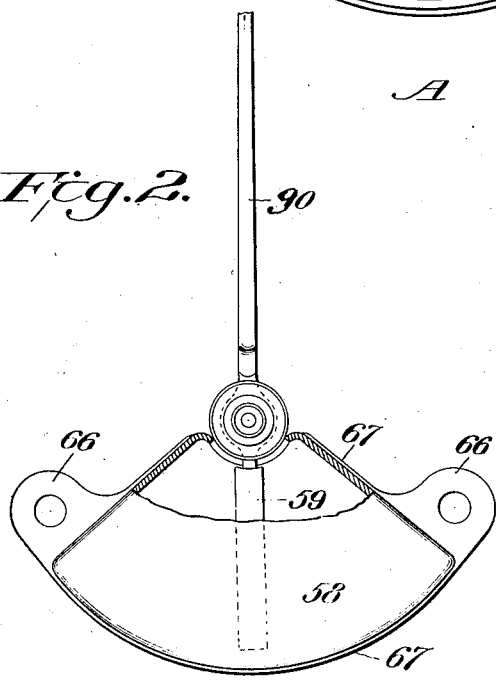
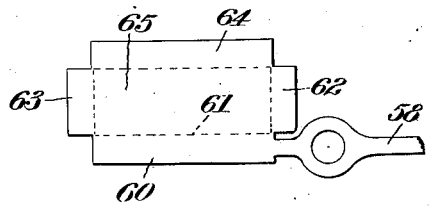
Inventor
Edward Weston
By Byrnes Townsend + Brickenstein
Attorneys

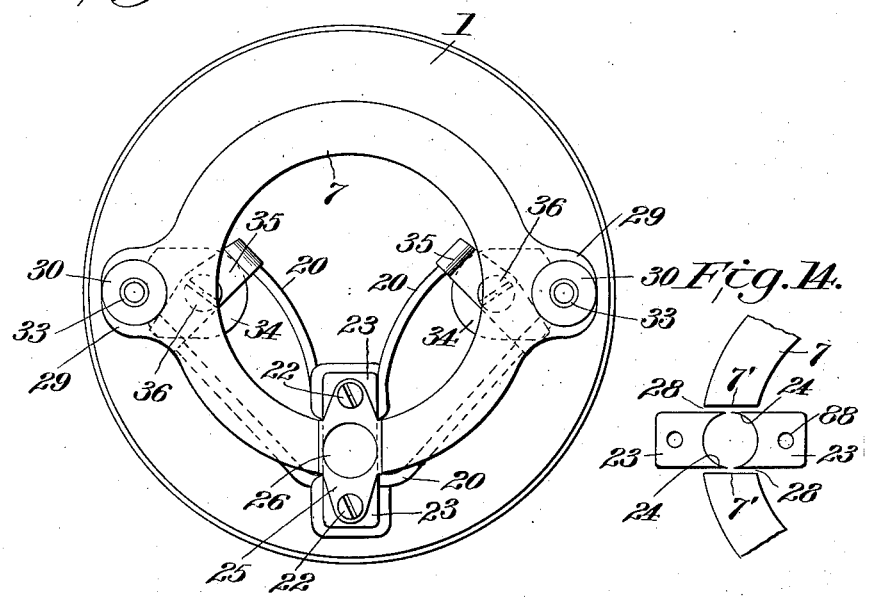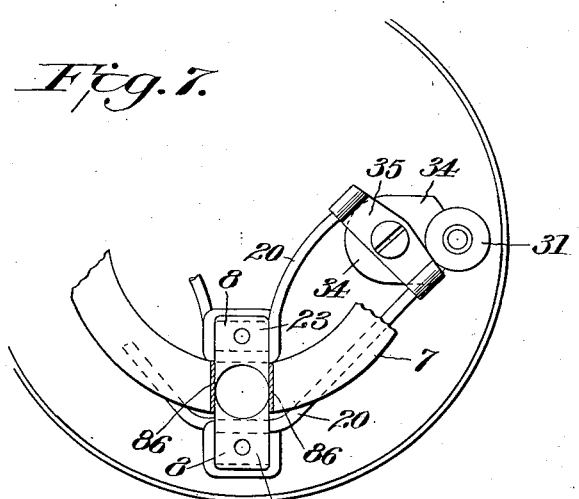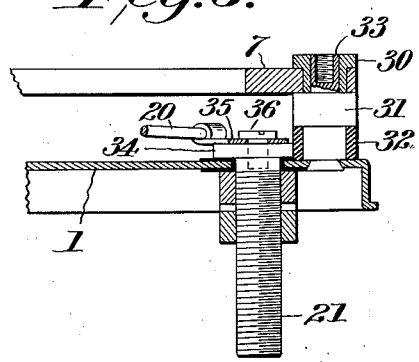

Mar. 3, 1925.
E. WESTON
1,528,460
ELECTRICAL MEASURING INSTRUMENT
Filed June 15, 1916    3 Sheets-Sheet 3
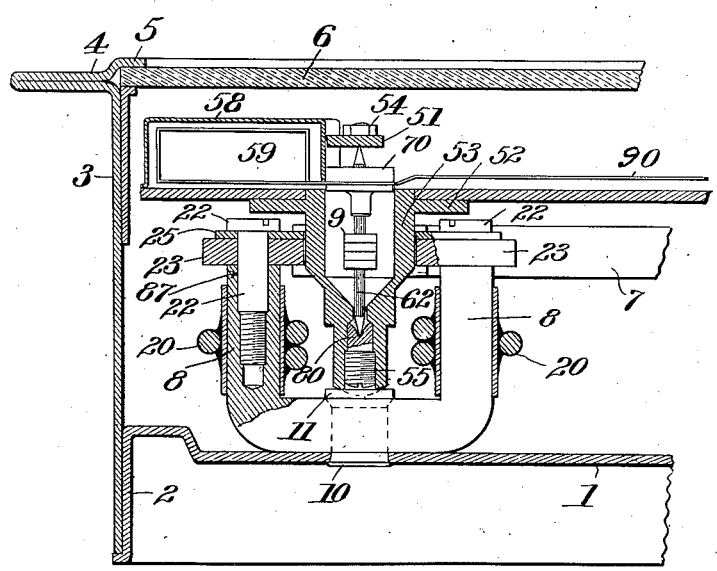
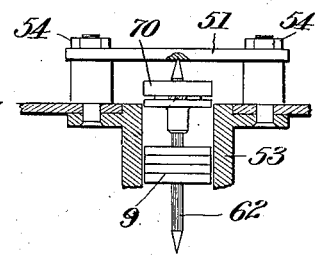
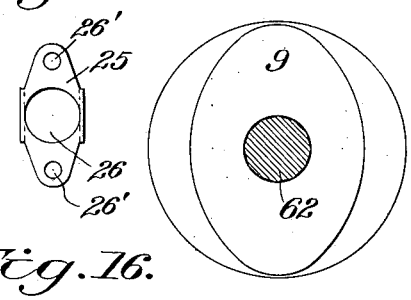
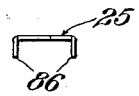
Inventor
Edward Weston
By Byrnes Townsend H Brickenstein
Attorneys Patented Mar. 3, 1925.

1,528,460

UNITED STATES PATENT OFFICE.

EDWARD WESTON, OF HILLSIDE, NEW JERSEY, ASSIGNOR TO WESTON ELECTRICAL INSTRUMENT CORPORATION, OF NEWARK, NEW JERSEY, A CORPORATION OF NEW JERSEY.

ELECTRICAL MEASURING INSTRUMENT.

Application filed June 15, 1916. Serial No. 103,829.

*To all whom it may concern:*

Be it known that I, EDWARD WESTON, a subject of the King of Great Britain, residing at Hillside, in the county of Union and State of New Jersey, have invented certain new and useful Improvements in Electrical Measuring Instruments, of which the following is a specification.

My invention relates to electrical measuring instruments and particularly to instruments intended to measure the quantity and direction of current flow.

Broadly speaking, my invention constitutes a new type of electrical measuring instrument, which possesses certain new and valuable electrical, magnetic and mechanical characteristics and a mode of operation radically different from those presented by any preceding type or form of instrument of the same general class to which my new type relates.

My invention also embraces many new features of electrical and mechanical design and construction, some of which can be advantageously applied to other types or forms of indicating and electrical measuring instruments.

The principal object of my invention is to provide simple, cheap, extremely durable, highly efficient, relatively and especially permanently accurate instruments for use as indicators of the direction and of the strength of the current flowing in the circuits of the electric lighting, ignition and starting systems now so extensively employed on automobiles. But my new instrument is also applicable to many other uses. It is particularly adapted for use in all cases where instruments are subjected to intense mechanical vibration and are exposed to the action of other external disturbing factors and forces which make all preceding types and forms of electrical measuring instruments unreliable as to accuracy, durability and the permanence and stability of the values of their operative forces.

My instrument has been so designed and constructed that the various difficulties in prior types of instrument, whether inherent or incident to use, have been successfully overcome, several hundred thousand of these instruments being in actual use.

My invention, thus relates to an electrical indicating instrument, such as an ammeter, in which a magnetic field of force is produced, of such character that the magnetically polarized needle located entirely within and actuated thereby shall efficiently afford permanently accurate and uniform indications of current strength and direction; in which the magnetic systems is efficiently shielded against the action of external or stray magnetic fields, and, specifically, so shielded by parts of the magnets themselves; in which the parts are so arranged that the magnetic strength of the permanent magnet is maintained; and in which by reason of improvements in a number of important details of magnetic and mechanical construction and arrangement, the desired cheapness, durability, efficiency and accuracy are obtained. The manner in which these desirable results have been obtained will appear from the accompanying description and drawings.

In the accompanying drawings—

Fig. 1 is a plan view of the instrument.

Fig. 2 is a plan view of the indicating needle and damper mechanism, with a portion of the damper chamber cover cut away.

Fig. 3 is a detail showing the stamped out blank from which the damper chamber is formed, a portion of the index or pointer being cut away.

Fig. 4 shows in section the special form of screw used for securing the face-plate.

Fig. 5 is a partial detail of the screw driver used with the screw of Fig. 4.

Fig. 6 is a plan of the instrument with the scale plate and parts carried thereby, removed.

Fig. 7 is a detail showing the magnets with upper portion of the spacer omitted.

Fig. 8 is a detail showing one of the terminal connections and the means for securing the permanent magnet to the base plate.

Fig. 9 is a sectional elevation on plane A—A of Fig. 1.

Fig. 10 is a plan of the magnetic needle, with its staff in section.

Fig. 11 is a detail showing the means for connecting the staff of the magnetic needle to the index and damper.

Figs. 12 and 13 are respectively a plan and elevation of the pole-pieces of the electromagnet.

Fig. 14 is a plan view showing the arrangement of the pole-pieces of the electromagnet in relation to the polar surfaces of the permanent magnet.

Figs. 15 and 16 are plan and end views of the "spacer".

Fig. 17 is a vertical section through the axis of the staff of the magnetic needle, at right angles to the plane of Fig. 9.

Referring to Fig. 9, 1 is a base plate, preferably made of sheet metal and having a downwardly extending flange 2, to which is secured the enclosing case 3, provided with a flange 4 by which the instrument is secured to a support, such as the cowl or dash-board of an automobile. This casing 3 is conveniently made in one piece by drawing a sheet of metal into a cup having a bottom shaped to form an inwardly extending flange when its centre is removed; then spinning out a portion of the side wall and pressing together the side walls of such portion to form the flange 4. 5 is the flange which holds in place a glass cover plate 6.

The magnetic system comprises a permanent magnet 7, an electromagnet 8, and a pivoted soft iron needle 9, to which is secured the index or pointer 90, moving over a scale-plate 91, having thereon a scale 92.

The core of the electromagnet is riveted to the base plate 1, by a rivet 10 having a countersunk top-portion 11, with a flat upper edge-portion which acts as one point of support for the tubular end of the movement support, to be described later. Wound about each leg of the electromagnet core is a turn of insulated wire 20. In this particular instrument these wires are shown as connected in multiple to the binding posts or terminals 21, though, of course, a single wire might be used.

To each leg of the core of the electromagnet is secured by steady pin screws 22, a parallel-sided pole piece 23 rectangular in cross-section and having horns 24, extending into proximity to the poles of the permanent magnet, and in this particular instance, the horns 24 are shown as extending inwardly between the parallel polar surfaces 7' of the permanent magnet (see Fig. 14), though spaced therefrom by an exceedingly small air-gap, 28.

For the purpose of accurately locating and accurately maintaining the position of the poles of the electromagnet with respect to the poles of the permanent magnet, and for the further purpose of accurately locating and accurately maintaining the position of the poles of both of these magnets with respect to the center of the magnetically polarized pivoted needle, I provide a "locator" or "spacer" 25, made of non-magnetic material, preferably brass. This "locator" is a relatively long and rather narrow flat strip, and is provided, on each of its opposite sides, with a narrow right-angled flange 86. The distance between the inner surfaces of these two flanges corresponds exactly with the width of the pole-pieces of the electromagnet, and these flanges form a groove in the "locator" by means of which the two poles of the electromagnet are accurately brought into line with each other. The upper flat part of this locator has a circular aperture 26, the radius of which is equal to the radius of the circularly curved ends of the poles of the electromagnet. The center of this aperture is exactly equidistant from the two parallel flanged sides of the locator. At opposite ends of the locator are two circular apertures 26' of smaller diameter, the center of each of which is equidistant from the center of the aforesaid large aperture. The diameter and distance apart of these two small apertures corresponds exactly with the diameter and distance apart of the holes 87 in the two upwardly projecting ends of the limbs of the electromagnet. The small holes in the locator also correspond in diameter with the small hole 88 in each of the pole-pieces. The distance between the center of the large aperture and the center of the small apertures in the locator is the same as the distance between the center of the small hole in the pole-pieces and the center of the arc about which the circularly curved ends of pole-pieces is described. Hence it follows, that when the two pole-pieces are put in the groove of the locator (with their arc-shaped ends facing each other) and the centers of the small holes in them in line with the centers of the holes in the pole-pieces, then the steady pin screws 22, can be inserted and their screw-threaded ends used to bind the locator and pole-pieces to the limbs of the electromagnet in such a way that the edge of the large circular aperture in the locator coincides with the edges of the two circularly curved ends of the pole-pieces. The narrow flanges on the opposite parallel sides of the locator not only serve to keep the pole-pieces in line, but they also act as "spacers" to accurately establish and to accurately maintain the distance between the poles of the permanent magnet and the poles of the electromagnet. The large circular aperture 26, in the locator, serves as a means of accurately locating and accurately maintaining the center of the magnetically polarized needle with respect to the magnetic axes of both the permanent and the electromagnet. This is accomplished by using the movement support as itself a spacing device to accurately locate and to accurately maintain the axial position of the magnetically polarized needle with respect to the poles of both magnets; for the movement support accurately establishes and accurately maintains the distance between the axis of the moving system and the poles of both magnets, because the sides of the movement support are in contact with the sides of the aperture 26, in the locator, and the axis of the moving system is centrally located with respect to the sides of the movement support.

The permanent magnet 7 is here shown as ring-shaped, though this shape is not essential, and is provided with perforated ears 29, 29, and flanged brass bushings 30, (Fig. 8) secured in the perforations. The upper surfaces of these bushings are exactly true and afford two points of support for the scale-plate. Extending through each bushing is a post 33, having a screw-threaded aperture in its upper portion to receive a screw 50, and an annular flange 31, between which and the base plate is an insulating bushing 32. The lower end of the post, 33, is riveted to the base-plate, so that the permanent magnet is rigidly held in spaced relation to the base-plate. The head 34 of the binding-post 21 is laterally extended and provided with a curved portion embracing the insulating ring 32, this arrangement preventing the turning of the binding-post, when the circuit terminals are attached thereto. A plate 35 is connected to the wires 20 and is brought by screw 36 into firm electrical contact with post 21.

The adjacent polar faces 7' of the permanent magnet are ground so that they are in exact parallelism, the distance between these faces being so determined, as to just include the flanges of the "locator" or "spacer" and the pole-pieces of the electromagnet.

It will be apparent from the construction so far described that the permanent magnet, the electromagnet and the necessary circuit connections are assembled in a compact form all attached to and removable from the instrument as one structure, and it will be further evident that the magnets are so arranged that their relative position, in this instance, with the axes of the fluxes from the two magnets at right angles to each other, cannot be disturbed by any vibration or shock, incident to use, particulary on an automobile.

It will further be noted that, as shown in Fig. 9, the permanent magnet is thicker than the pole-pieces of the electromagnet, and therefore extends above and below these pole-pieces; and also that the depth of the magnetic needle is sligthly greater than the thickness of the pole-pieces of the electromagnet and slightly less than the thickness of the permanent magnet.

The effect of this arrangement will be referred to later.

As an important and novel feature of my invention, I assemble in another compact self-contained structure, the scale plate and movement devices which carry the magnetic needle and index or indicator, this whole moving-system structure being removable from the fixed-element structure just described, by taking out the screws 50 (Figs. 1 and 8).

Referring to Figs. 1, 9, and 17, 51 is a bridge-piece, having in its lower portion, a conical depression acting as a bearing for the upper end of the staff 62 carrying the magnetic needle 9. This bridge is held in spaced relation to the scale plate by posts 54, which pass through the scale plate 91 and the flange 52 of a movement support or casing 53, the lower ends of the bolts being expanded or riveted against said flange to form a permanent connection therewith. The movement support 53 is provided with an upwardly extending boss which exactly fits the corresponding opening in the scale plate, and has an upper cavity within which the soft-iron magnetic needle 9 is mounted, the staff of the needle passing through an opening in the conical bottom of the cavity, this opening being of but slightly greater diameter than the staff. Screwed into a chamber in the lower portion of the movement support is a screw 55 having at its upper end a countersunk cavity, preferably with curved side walls, which provides a pivot-seat for the lower end of the staff. By adjustment of this screw, the ends of the staff can be brought into exact location in the two pivotal cavities, and the location of the magnetic needle fixed in its precise location with reference to the poles of the permanent and to the poles of the electromagnet. It will be noted that the upper edge wall of the pivotal cavity in the screw 55 is located beneath the overhanging portion of the wall through which the staff passes, so that it is not possible, in assembling these parts, for the pointed end of the staff to strike against the edges, of the screw, the staff being positively guided, by the narrow opening through which it passes, into the pivotal cavity. The upper portion 80, of the screw is truly cylindrical and exactly fits a corresponding cylindrical cavity in the support 53, thereby enabling the pivotal cavity to be precisely centered in said support. The staff itself is polygonal, shown in Fig. 10 as twelve-sided, so that, when driven into punched openings in the parts to which it is to be secured, no further fastening devices are needed.

The magnetic needle 9 is made up of several soft-iron laminæ, each of elliptical form with a circular opening punched exactly at the center.

The index or pointer 90 is mounted near the upper end of the staff and is secured, as shown in Fig. 11, to a flanged sleeve or collet 85, having an upwardly extending boss 56. The flat perforated central portions of the index and of the cup 70 are placed over the boss, a washer 57 is placed in the bottom of the cup and above the index, and the metal of the outer edge of the boss then forced over the washer to rigidly hold the index and cup to the sleeve and thus to the staff.

The index or pointer 90 is made of thin sheet metal, preferably aluminum, this index 90 and damper-vane 59 being formed in one piece from the blank of the form shown in Fig. 3. The damper-vane 59 is box-shaped, and is formed by bending the blank along the line 61 at right angles to the side 60 and also bending the ends 62, 63 and side 64 at right angles to the bottom 65. The damper-vane is so proportioned that its weight exactly or very closely counterbalances that of the index 90.

The damper-vane is arranged to move within a sector-shaped damper-chamber 58, preferably stamped out of sheet metal and provided with perforated ears 66 and a reinforcing and air sealing flange 67, at its lower edge, and is secured in place by bolts 68. At its inner portion the damper chamber has a circular wall, so that the inner flanged edge of the damper-vane will move in close proximity thereto: this wall being cut away at its lower portion, as shown in Fig. 9, to permit the passage thereunder of the flat portion 69 of the index. In order to lessen the flow of air through the thus-formed opening, an open-topped cup 70 is secured (see Fig. 11) above the pointer by the washer 57, as heretofore described. The box-shaped damper-vane fits closely the walls of the damper-chamber; the exceedingly narrow and relatively long air passages thus produced causing a practically dead-beat damping of the swing of the needle.

I thus provide a moving system which is rigidly constructed and of exceedingly light weight.

In actual practice, the total weight of the staff needle, index and damper-vane is only 1.3 grains.

The wear on the pivots and their bearings is therefore, in use, exceedingly small and the durability of this structure insured. Notwithstanding the minute weight and size of these parts, the structure has been found in practice to satisfactorily withstand the arduous conditions of jar, and enormous stresses imposed upon it by the enormous current surges, to which these instruments are subjected when used on automobiles. It will be noted that the whole moving system is attached to the scale plate, two posts or bolts serving to receive the bridge (upper pivot) and the moving structure support (lower pivot) to the scale-plate.

This moving system structure carried by the scale plate has three points of support, viz, the two bushings in the lugs on the permanent magnet to which the scale plate is secured and the rivet 10, on which rests the moving system support 53. The scale plate is thus rigidly held in place and certainty of location of the needle axis in its proper position is secured.

The axis of the moving system is definitely fixed with reference to the holes in the scale plate, so that in assembling the instrument, all that is required is to insert the moving system supporter 53 into the aperture 26 of the spacer, and fasten the scale plate in place by the screws 50, the axis of the moving system being thereby definitely located in its proper and predetermined relation to the poles of both magnets.

The screws 50 are made of the shape shown in Fig. 4, so that in case the index hand should be forced over by an excess current beyond the extreme end of the scale, the hour-glass shape will prevent the end of the index from riding up over the top of the screw and getting caught on the other side. In order to prevent slipping of the screw-driver from the slot in the screw, and thereby possibly causing damage to the face of the scale plate, I provide a cavity in the slot, and use a screw-driver having a corresponding projection as shown in Fig. 5.

In the drawing, the various parts have been illustrated on a scale much larger than that of the instruments as used on automobiles. In these small instruments, the distance between the opposite exactly parallel polar faces of the permanent magnet is only about 0.240 inch. The pivoted magnetic needle is mounted at a point equidistant from these faces, and between the opposing space between the horns of the pole-pieces of the electromagnet with a clearance of about 0.070 inch. The inwardly extending pole-pieces are about 0.055 inch thick; the permanent magnet is about 0.100 inch thick; the needle is about 0.080 inch thick; and the spaces between the horns of the pole-pieces of the electromagnet about 0.050 inch.

The lateral edges of the pole-pieces of the permanent magnet extend into very close proximity to both poles of the electromagnet, the space between in a commercial instrument not being over .015 inch, so that the air gap between the poles of the permanent magnet and the two poles of the electromagnet is extremely small, with the result that the pole-pieces of the electromagnet act virtually as a keeper for the poles of the permanent magnet, which is almost on a dead closed magnetic circuit. A further keeper feature is due to the fact that the needle itself is of a relatively large cross-section and depth, deeper than the thickness of the pole-pieces of the electromagnet, so that there is a direct passage for lines of force from the pole-pieces of the permanent magnet through the magnetic needle with air gaps of the exceedingly small dimensions above referred to. Hence the reluctance of the magnetic circuit in this instrument is exceedingly low, whereas in the instruments of the Deprez-D'Arsonval type, the reluctance of the magnetic circuit is invariably very large. The effect of thus cutting down the reluctance is to maintain the magnetic saturation of the permanent magnet and thereby give the magnetic system of the instrument enormous stability,—greater stability than any other form of magnetic instrument known to me. Consequently, the indications of the instrument will remain accurate indefinitely.

Further, the construction already referred to also has the marked and very important practical advantage that the movable magnetic needle is virtually surrounded by bodies of iron and steel, so that the indications of the instrument are virtually unaffected by external magnetic fields of such strength as are ordinarily met with in practice, and unaffected by proximity to masses of iron and steel.

The location of the magnetic needle entirely within the magnetic field produced by the closely associated and symmetrically arranged poles of the permanent and electromagnets has the further mechanical advantages that not only are all the magnetic forces acting on the needle balanced, so that there are practically no unbalanced lateral pulls tending to cause the staff to unduly bear against its pivots, but these forces also actually tend to in part support the weight of the needle, which can thus move with the greatest freedom and only exceedingly small torques are required, and as the lines of force from both poles of the electromagnet act on the needle, only an exceedingly small number of turns in the coil of the electromagnet are required to produce this requisite torque. The voltage drop across the terminals of the instrument (as low as 11 millivolts in practice) and the energy expended in it are therefore exceedingly small, and the deteriorating effect of the flux from the electromagnet on the permanent magnet is still further minimized, so that it is practically nil.

This will be evident for the reason that the arrangement of the electromagnet at right angles to the permanent magnet and with its pole-pieces in close proximity to each other and to the poles of the permanent magnet, is such that only a very small portion of the flux from the electromagnet passes through the permanent magnet, and this portion passes only through the end portions of the permanent magnet and not through its body. The magnetic strength of the permanent magnet is thus practically unimpaired by the flux from the electromagnet. Moreover, as above pointed out, owing to the arrangement by which the flux of the electromagnet is effectively used to affect the needle, this flux is so small in quantity that its deteriorating influence on the permanent magnet is practically negligible.

The action of the fluxes in my instrument are also quite peculiar and quite different from any other form of instrument known to me. In my instrument, three paths are provided for the flux to reach the movable needle. Since the needle is thicker in the direction of its axis or rotation than the pole-pieces of the electromagnet and somewhat thinner than the permanent magnet, it is obvious that a part of the flux from the permanent magnet will reach the needle by passing over the top of the pole-piece of the electromagnet, and part of the flux from the permanent magnet will similarly reach the needle from below the lower surface of the permanent magnet, and part of the flux will pass directly through the space left between the horns of the poles of the electromagnet. The position finally taken by the needle under the action produced by the current passing through the coil and around the core of the electromagnet depends upon the action of all these three fluxes, and the additional flux passing between the two poles of the electromagnet. By properly proportioning the thickness of the pole-pieces of the electromagnet and the distance between their horns, the thickness of the polar-needle, and the thickness of the poles of the permanent magnet, I obtain practically uniform division on the scale, that is, it is by these means that I am able to make the angle traversed by the needle or pointer of the instrument practically proportional to the strength of the current flowing through the coils of the electromagnet.

With the parts proportioned as above mentioned, I have found that the angular movements of the index very closely correspond to the variations in the current strength being measured, so that a uniformly divided scale may be obtained.

Of course these dimensions may be varied so as to make scales, as may be occasionally required in practice, more open at one or another part of it, in accordance with the requirements of a user.

The instrument above described is designed so that the magnetic fluxes and the needle on which they exert their forces are so related that accurate and uniform indications of current strength and direction are provided for; that the magnetic field produced by the permanent magnet is kept substantially uniform in value for long periods by avoidance of influences tending to disturb the strength of the permanent magnet; and the mechanical and engineering features of construction are such that the parts of the instrument can be cheaply made and readily assembled.

While I have described in detail the construction of the instrument, it will be understood that, except as specifically claimed, my invention is not limited to such details, as other and equivalent means of attaining the same results will be apparent to those skilled in the art.

I claim:—

1. In an electrical measuring instrument, a permanent magnet, an electromagnet, a magnetically polarized needle provided with an index, the poles of the permanent magnet and of the electromagnet being so constructed and arranged as to virtually surround the needle with bodies of magnetic material.

2. In an electrical measuring instrument, a permanent magnet, an electromagnet having poles extending into proximity to the poles of the permanent magnet thereby forming a magnetic circuit of extremely low reluctance, and a magnetically polarized needle provided with an index, the needle being located between the poles of the magnets.

3. In an electrical measuring instrument, a permanent magnet, an electromagnet having poles extending between the poles of the permanent magnet, and a magnetically polarized needle provided with an index, the needle being located between the poles of the magnets.

4. An electrical measuring instrument having a permanent magnet with adjacent polar surfaces, an electromagnet having poles extending into close proximity to said polar surfaces, thereby forming a magnetic circuit of extremely low reluctance, the plane of the permanent magnet being at right angles to the plane of the electromagnet.

5. An electrical measuring instrument having a permanent magnet with adjacent polar surfaces, an electromagnet having poles extending between said polar surfaces, the plane of the permanent magnet being at right angles to the plane of the electromagnet.

6. In an electrical measuring instrument, a permanent magnet having adjacent polar surfaces, an electromagnet, pole pieces thereon extending into close proximity to the polar surfaces of the permanent magnet and a magnetically polarized needle provided with an index mounted between the pole pieces of the magnets, the polar surfaces of the permanent magnet and of the said pole pieces forming substantially a single continuous surface.

7. In an electrical measuring instrument, a permanent magnet having adjacent polar surfaces, an electromagnet, pole pieces thereon extending into close proximity to the polar surfaces of the permanent magnet and a magnetically polarized needle provided with an index mounted between the pole pieces of the magnets, the pole pieces of the electromagnet furnishing a path of small reluctance for the flux between the poles of the permanent magnet, and arranged to produce, when the electromagnet is energized, a flux at right angles to the flux produced by the permanent magnet.

8. An electrical measuring instrument having a permanent magnet with adjacent polar surfaces, an electromagnet having pole pieces extending between the polar surfaces of the permanent magnet, said pole pieces being of less thickness than the permanent magnet at its polar surfaces, a magnetically polarized needle mounted to oscillate between said pole pieces, said needle being of greater thickness than the pole pieces of the electromagnet, and extending above and below the pole pieces of the electromagnet.

9. In an electrical measuring instrument, a permanent magnet and an electromagnet adapted to produce magnetic fluxes substantially at right angles to each other and so located as to form a substantially closed ring of magnetic material, and a magnetically polarized needle within said ring provided with an index.

10. In an electrical measuring instrument, a permanent magnet, an electromagnet, and a magnetically polarized needle provided with an index, the median plane of the permanent magnet, the median plane of the poles of the electromagnet, and the median plane of needle being in substantial coincidence, the axis of the needle being at right angles to said plane and symmetrically located with reference to the polar faces of both magnets.

11. In an electrical measuring instrument, a permanent magnet, an electromagnet, and a magnetically polarized needle provided with an index, the median planes of the field between the poles of the permanent magnet, the median plane of the field produced by the poles of the electromagnet and the median plane of the needle being in substantial coincidence, the axis of the needle being at right angles to said plane and symmetrically located with reference to the polar faces of both magnets.

12. In an electrical measuring instrument, a flat curved permanent magnet having adjacent polar faces, an electromagnet disclosed at right angles to the permanent magnet, the poles of the electromagnet being in close proximity to the poles of the permanent magnet and forming therewith a substantially closed ring.

13. In an electrical measuring instrument, a flat curved permanent magnet having adjacent polar faces, an electromagnet disposed at right angles to the permanent magnet, the poles of the electromagnet being in close proximity to the poles of the permanent magnet, and located between the poles of the permanent magnet.

14. In an electrical measuring instrument the combination with a permanent magnet having adjacent and parallel polar faces and an electromagnet having parallel pole pieces rectangular in cross section and extending between said polar faces, a locator or spacer consisting of a flat body having a central circular opening and end openings, pins passing through said end openings and securing the spacer to the electromagnet, the spacer having parallel right angled side flanges embracing the poles of the electromagnet and extending downwardly into the space between the polar faces and the sides of the pole pieces.

15. In an electrical measuring instrument, the combination with a permanent magnet having adjacent and parallel polar face portions, an electromagnet having a curved terminal portion extending into proximity to the polar face portions of the permanent magnet and a spacing device embracing the terminal portion of the electromagnet and having parallel side portions extending into contact with the parallel polar face portions.

16. In an electrical measuring instrument, the combination of a permanent magnet having adjacent poles, an electromagnet, a moving system comprising a magnetically polarized needle and its support, and spacing means connected to the core of the electromagnet and extending between the poles of the permanent magnet for definitely locating the electromagnet with reference to the poles of the permanent magnet.

17. In an electrical measuring instrument, a permanent magnet having adjacent and parallel polar face portions, an electromagnetic device having a core whose end portion is in proximity to the polar faces, and means on the said end portion for determining a definite spacing relation between the electromagnet and the poles of the permanent magnet.

18. In an electrical measuring instrument, a permanent magnet having adjacent and parallel polar face portions, an electromagnetic device whose end portion is in proximity to the polar faces, and means for holding the electromagnetic device in definite relation to the poles of the permanent magnet, said means comprising a member embracing the electromagnetic device and having parallel spaced portions engaging the polar face portions of the permanent magnet.

19. A damping system for indicating instruments comprising a generally sector-shaped, open-bottomed box having a circular wall at its inner end of less depth than the side walls, a damper-vane within said box, a pointer formed integrally with said damper-vane and having a portion thereof extending beneath said circular wall, and a cylindrical wall having the same curvature as the curved wall of the damper box and secured to said pointer in proximity to the bottom of said curved wall.

20. An indicator for indicating instruments comprising a magnetizable body having punched therein a centrally located circular aperture, and a polygonal staff forced into said aperture.

21. An indicator for indicating instruments comprising a laminated magnetizable body having punched therein a centrally located circular aperture, and a polygonal staff forced into said aperture.

22. A moving system for electrical measuring instruments comprising a polygonal staff, a magnetizable body having a circular opening into which the staff is forced to secure the staff to the needle, a collet similarly secured to said staff and an index secured to said collet.

23. A moving system for electrical measuring instruments comprising a polygonal staff, a magnetizable body having a circular opening into which the staff is forced to secure the staff to the needle, a collet similarly secured to said staff and an index and damper cup secured to said collet.

24. A movement support comprising a flanged casing having at its upper portion a cylindrical cavity with a conical bottom perforated at its center, a second cylindrical cavity of larger diameter than said perforation, and a screw-threaded portion below said second cavity; and a pivot bearing having a screw thread to engage said screw-threaded portion and a cylindrical portion fitting said second cavity, and having, centrally located in its upper portion, a conical depression to act as a bearing.

25. A movement support comprising a flanged casing with an upwardly extending cylindrical boss, said casing having at its upper portion a cylindrical cavity with a conical bottom perforated at its center, a second cylindrical cavity of larger diameter than said perforation, and a screw-threaded portion below said second cavity; and a pivot bearing having a screw thread to engage said screw-threaded portion and a cylindrical portion fitting said second cavity, and having, centrally located in its upper portion, a conical depression to act as a bearing.

26. A moving system support for an oscillating staff comprising a cylindrical portion having at its bottom a guiding perforation, a chamber of larger diameter than and beneath said perforation, and an adjustable bearing member in said chamber.

27. A moving system support for an oscillating staff comprising a cylindrical portion having at its bottom a guiding perforation, a chamber of larger diameter than and beneath said perforation, and an adjustable bearing member in said chamber, said member having a conical depression in its upper end.

28. A moving system support for an oscillating staff comprising a cylindrical portion having at its bottom a guiding perforation, a chamber of larger diameter than and beneath said perforation, and an adjustable bearing member in said chamber, said member having a conical depression with curved walls in its upper end.

29. A moving system support for an oscillating staff comprising a cylindrical portion having at its bottom a guiding perforation, a chamber of larger diameter than and beneath said perforation, and an adjustable bearing member in said chamber, said member having a conical cavity in its upper end, the diameter of the base of said cavity being greater than the diameter of the perforation.

30. The combination with a scale plate having a cylindrical opening therein of a moving system support, means for securing said support to the scale plate, said support having an upwardly extending cylindrical boss fitting into said opening, whereby the support is accurately located in the scale plate.

31. The combination with a permanent magnet having adjacent poles, studs located in perforations on each leg of the permanent magnet, a scale plate having perforations spaced to receive the studs, a moving system support secured to the scale plate and so located thereon with reference to the openings therein that when the scale plate is secured to the studs the moving system support will be in a predetermined operative relationship to the poles of the magnet.

32. The combination with a permanent magnet having adjacent poles, studs located in perforations on each leg of the permanent magnet, a base plate and means for securing the magnet thereto by said studs, a scale plate having perforations to receive securing means connected to the studs, a moving system support secured to the scale plate and so located thereon with reference to the openings therein that when the scale plate is secured to the studs, the moving system support will be in a predetermined operative relationship to the poles of the magnet.

33. In an electrical measuring instrument, a permanent magnet having adjacent poles, an electromagnet having a core extending into proximity to said poles, spacing means secured to the electromagnet for maintaining it in definite relation to the permanent magnet, said spacing means having a perforation located between said poles, a scale plate, a moving system support secured thereto, means for securing the scale plate to the permanent magnet, said securing means being so located with reference to the moving system support that when the scale plate is secured to the permanent magnet the moving system support will fit into the perforation in the spacing means.

34. In an electrical measuring instrument, a permanent magnet having adjacent poles, an electromagnet having pole pieces extending into proximity to said poles, spacing means secured to said pole pieces for maintaining the electromagnet in definite relation to the permanent magnet, said spacing means having a perforation located between said poles and pole pieces, a scale plate, a moving system support secured thereto, means for securing the scale plate to the permanent magnet, said securing means being so located with reference to the moving system support that when the scale plate is secured to the permanent magnet the moving system support will fit into the perforation in the spacing means.

35. In an electrical measuring instrument, a base plate, a permanent magnet, a post for supporting the magnet on the base plate, an insulating bushing on said post, a circuit terminal stud extending through said base plate and having a head shaped to embrace said bushing, and means outside said base plate for securing conductors to said stud.

36. The combination of the base plate, a post thereon, a circuit terminal stud extending through said base plate and having a head portion shaped to embrace said post, means outside said base plate for securing conductors to said stud, and means for insulating said stud from the post and the base plate.

37. The combination of the base plate, a post thereon, a circuit terminal stud extending through said base plate and having a head portion shaped to embrace said post, means outside said base plate for securing conductors to said stud, means for securing a conductor inside said base plate to said stud, and means for insulating said stud from the post and the base plate.

38. An indicating instrument having an oscillating index, stops against which said index abuts at the extremes of its movement, said stops having an overhanging head portion.

39. In an electrical measuring instrument, a scale plate, an oscillating index, stops against which the index abuts at the extremes of its movement, said stops securing the scale plate to the base support, and having overhanging head portions extending above said plate.

40. An indicating instrument having a magnet system, a scale plate secured to but detachable therefrom; a moving system comprising an index and a pivotal mounting therefor and a damper-vane connected to said index; and a support for said moving system secured to the scale plate.

41. An indicating instrument having a magnet system, a scale plate secured to but detachable therefrom; a moving system comprising an index, a magnetizable needle and a pivotal mounting therefor; and a support for said moving system secured to the scale plate.

42. In an electrical measuring instrument, the combination of a magnet system, a scale plate secured to but detachable therefrom, of a moving system comprising a staff, a magnetizable needle and an index mounted on said staff and pivotal supports for said staff carried by and secured to said scale plate.

43. In an electrical measuring instrument, the combination with a scale plate of a moving system comprising a staff, a magnetizable needle, an index and a damper-vane mounted on said staff; pivotal supports for said staff carried by and secured to said scale plate, and a damper chamber secured to the scale plate.

44. In an electrical measuring instrument, the combination with a scale plate of a moving system comprising a staff, a magnetizable needle and an index mounted on said staff; a bridge piece having a pivotal cavity therein; posts spacing said bridge piece from the scale plate, and a lower pivotal support, said posts having means for connecting both pivotal supports to the scale plate.

45. In an electrical measuring instrument, the combination of a permanent magnet, an electromagnet, a needle located in the field produced by fluxes from both magnets, and means providing a path of small reluctance for the flux of the permanent magnet.

46. In an electrical measuring instrument, the combination of a permanent magnet, an electromagnet, a needle located in the field produced by fluxes from both magnets, and means comprising iron located between the poles of the permanent magnet for providing a path of small reluctance.

47. In an electrical measuring instrument, the combination with the base plate, of an electromagnet, a post for securing the core of the electromagnet to the base plate, a permanent magnet secured to said base plate, a scale plate resting on and secured at two points to said permanent magnet, said scale plate having rigidly secured thereto the support for the oscillating magnetic needle, the bottom of said support resting on said post.

48. In an electrical measuring instrument, a permanent magnet, an electromagnet, pole pieces thereon in proximity to the poles of the permanent magnet, and means between the poles of the permanent magnet and those of the electromagnet to prevent relative motion of the said poles.

49. In an electrical measuring instrument, a permanent magnet having poles facing each other, an electromagnet having poles facing each other and disposed substantially at right angles to the poles of the permanent magnet to form therewith a substantially closed ring of magnetic material, and means interposed between the poles of the two magnets to prevent relative lateral shifting thereof.

50. In an electrical measuring instrument, a permanent magnet having poles facing each other, an electromagnet having poles facing each other and disposed substantially at right angles to the poles of the permanent magnet to form therewith a substantially closed ring of magnetic material, a moving system within the said ring and means for rigidly interconnecting the permanent magnet, the electromagnet and the moving system.

51. A device of the character described including a mounting plate, a permanent magnet secured to said mounting plate, an electromagnet secured to said mounting plate and provided with pole pieces so arranged that the lines of force set up by said electromagnet, unaffected by the lines of force of said permanent magnet, are substantially at right angles to the lines of force of said permanent magnet, a soft iron rotatable armature held in its normal position by said permanent magnet but adapted to be rotated therefrom when current is passed through said electromagnet, and means secured to said electromagnet for positioning said armature relative to said permanent magnet.

52. A device of the character described including a mounting plate, a permanent magnet secured to said mounting plate, an electromagnet secured to said mounting plate and provided with a pair of pole pieces and a bridge piece for positioning said electromagnet and one of said pole pieces in their respective positions.

53. An instrument of the character described including a mounting plate, an electromagnet attached to said mounting plate, a pair of pole pieces for said electromagnet, and a bridge of non-magnetic material secured at its one end to the core of said electromagnet and at its other end to one of said pole pieces, said bridge being provided with means for holding the other of said pole pieces in position.

In testimony whereof I affix my signature.
EDWARD WESTON.